United States Patent
Watkins

Patent Number: 6,150,948
Date of Patent: Nov. 21, 2000

[54] LOW-POWER RADIO FREQUENCY IDENTIFICATION READER

[75] Inventor: Randy W. Watkins, Chatsworth, Calif.

[73] Assignee: Soundcraft, Inc., Chatsworth, Calif.

[21] Appl. No.: 09/299,121

[22] Filed: Apr. 24, 1999

[51] Int. Cl.[7] .................................................. G08B 23/00
[52] U.S. Cl. .................. 340/693.3; 340/567; 340/825.34
[58] Field of Search .......................... 340/572.1, 573.1, 340/10.5, 825.34, 505, 567, 522, 693.3

[56] References Cited

U.S. PATENT DOCUMENTS

| | | | |
|---|---|---|---|
| 4,240,064 | 12/1980 | DevChoudhury | 235/462 X |
| 4,847,485 | 7/1989 | Koelsch | 340/567 X |
| 5,682,032 | 10/1997 | Philipp | 235/422 |
| 6,040,773 | 3/2000 | Vega et al. | 340/572.1 |

*Primary Examiner*—Thomas Mullen
*Attorney, Agent, or Firm*—Natan Epstein; Beehler & Pavitt

[57] ABSTRACT

Practical battery operation of radio-frequency proximity readers is made possible by monitoring activity in the RFID reader's sensing field with a secondary detector such as a passive infrared detector, and powering up the RFID reader only upon detection of activity by the secondary detector. The RFID reader is kept to a low duty cycle relative to the secondary detector which is chosen for relatively low power consumption to achieve a net reduction in operating power requirements of the combined RFID reader and secondary detector.

10 Claims, 1 Drawing Sheet

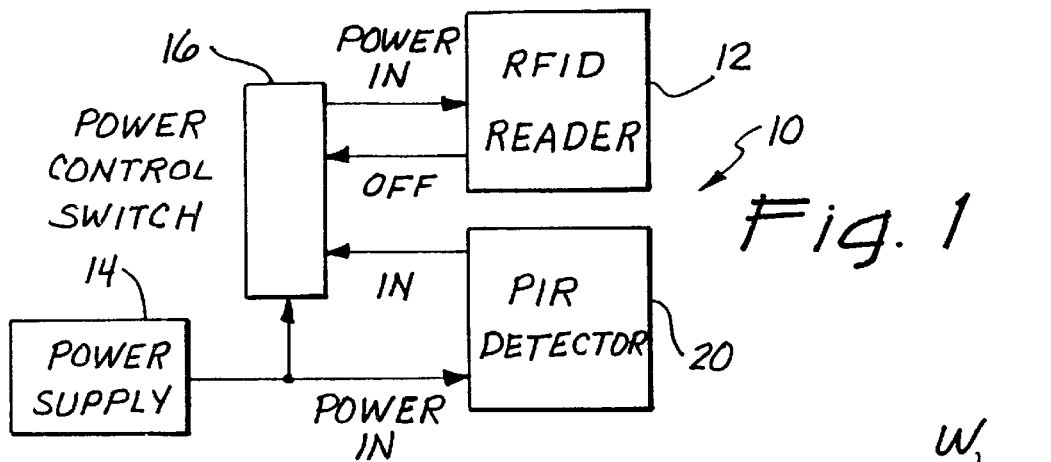
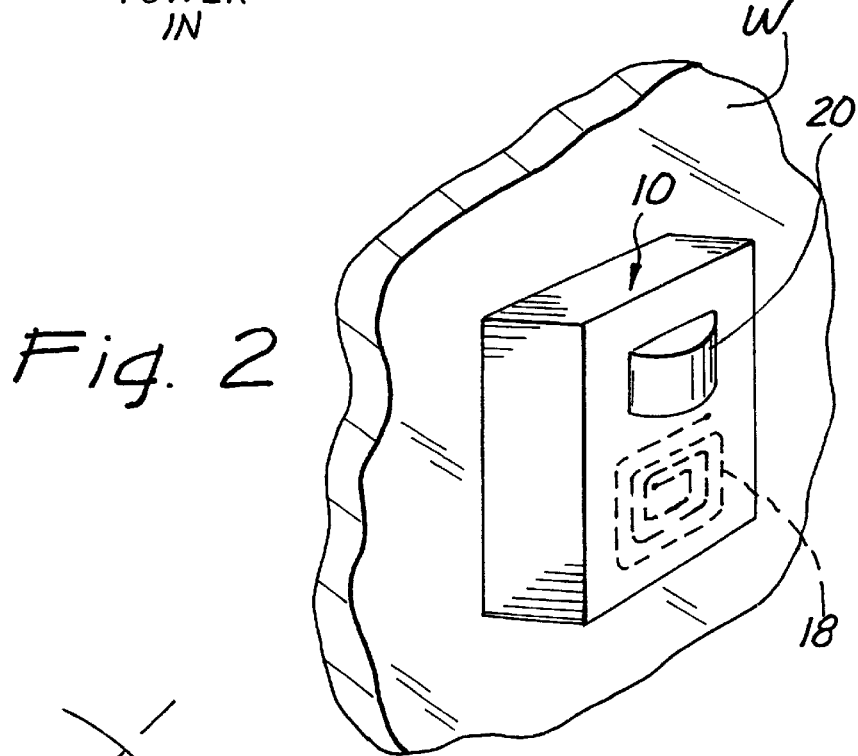
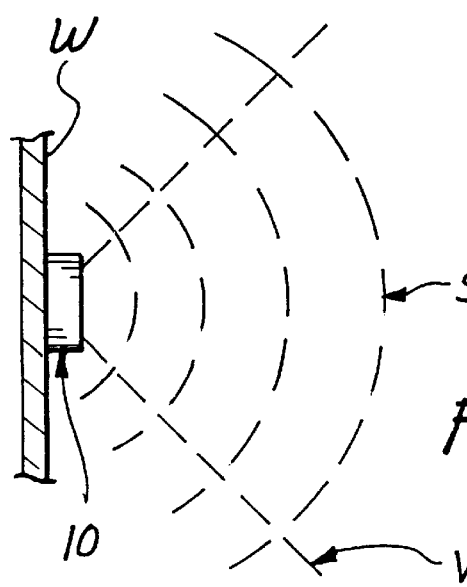

LOW-POWER RADIO FREQUENCY IDENTIFICATION READER

BACKGROUND OF THE INVENTION

1. Field of the Invention

This invention relates to radio-frequency identification readers used in conjunction with identification tags in controlled access systems, and more particularly is directed to low power proximity readers suitable for battery powered operation.

2. State of the Prior Art

Radio Frequency Identification Systems (RFID) have come into widespread usage and generally include a reader, typically installed in a fixed location, and a population of portable identification tags. Each ID tag contains a transponder unit which returns a coded response when interrogated by a radio-frequency transmission from the reader. The reader periodically sends out a transmission designed to evoke a radio-frequency response from any ID tags within range of the reader. The tag response includes coded identification data based on which the reader makes a decision to grant or deny access to controlled facilities. RFID systems may use active tags which carry their own source of power such as a battery, or passive tags which contain no source of power and instead rely entirely on energy radiated by the reader unit. Passive tag readers continually or periodically search for the presence of passive tags in the vicinity of the reader by transmitting energy which will activate any tag present. A passive tag does not announce is presence unless activated by the reader. Furthermore, the passive ID tag requires that is receive sufficient radio-frequency power which, when converted by the tag into the electrical current, will support operation of the tag's electronic circuits. Consequently, the operating range of the reader/tag system is to a large extent determined by the power transmitted by the reader, and the ID tag must come into sufficient proximity to the reader for the tag to be activated. For this reason passive tag readers as also known as proximity readers. Proximity readers typically have substantially greater operating power requirements than active tag RFID readers of comparable range, and the development of portable battery powered proximity readers has been hindered by excessive power drain on the batteries.

A continuing need exists for RFID readers of reduced operating power requirements and, in particular, for a low power proximity reader which can be adequately powered by batteries for portable use.

SUMMARY OF THE INVENTION

The present invention addresses the aforementioned need by providing a low power radio-frequency identification reader system which includes a RFID tag reader operative for detecting and verifying the presence of identification tags, and a secondary detector operative for detecting a change in the sensing field of the RFID tag reader indicative of the possible entry of an identification tag into the reader's sensing field and deriving an enabling signal responsive to such a change. By detecting such changes the secondary detector serves to detect the entry of an object into the sensing field but by means other than evoking a radio-frequency response from such an object.

A power supply is provided for supplying operating power to the RFID tag reader and to the secondary detector. The detector and the reader each have an average operating power requirement, and the secondary detector is selected to have a substantially smaller average operating power requirement than the reader. A power switching circuit normally limits or cuts of power from the power supply to the RFID tag reader while supplying the secondary detector. Full operating power to the RFID tag reader is enabled by the power switching circuit for a limited period of time in response to the enabling signal in order to verify the presence of an ID tag and, if so, to permit access to the controlled facilities. As a result, the RFID reader is relegated to a low duty cycle relative to the secondary detector and the overall or average operating power of the reader system is conserved by only operating the RFID tag reader briefly upon detection of a physical change such as movement in the reader's sensing field indicative of the possible presence of an ID tag.

Although the low power RFID tag reader system of this invention is not limited to any particular type of RFID reader, it will be found most useful with proximity or passive tag readers because of their relatively high operating power requirements. For this reason, in a preferred form of the invention, the RFID reader is a proximity reader designed to detect the presence of passive identification tags.

The secondary detector is not limited to any particular sensing technology. Rather, the secondary detector should be chosen to draw little power as compared to the RFID reader so that a significant power savings can be realized by reducing the duty cycle of the RFID reader and relying instead on the secondary detector most of the time. The secondary detector may, for example and without limitation, be selected from the group comprised of passive infrared, inductive, capacitive, microwave and ultrasound detectors. Generally the secondary detector operates as a motion detector since the changes to which it responds are normally brought about by movement of objects which are not necessarily ID tags. A presently preferred secondary detector is a passive infrared sensor designed to sense changes in the infrared background in the reader's sensing field.

Power savings may be optimized by limiting operation of the RFID reader to approximately the time period required to verify the presence of an ID tag, i.e., to transmit a radio-frequency interrogation signal, to receive and decode a response form an ID tag if present in the sensing field, and if an ID tag is detected, to execute an access control function such as unlocking a door and then locking it again. Upon completion of the tag read function or access control function, the tag reader outputs a disabling or off control signal to the power control switch for returning the tag reader to a power limited wait state.

This invention also extends to a method of operating a radio-frequency identification tag reader having a sensing field, comprising the steps of placing the RFID reader in a wait state or sleep mode, detecting the introduction of an object into the sensing field, activating or waking the radio-frequency reader for a relatively short period of time at least sufficient for evoking a response from an identification tag is present in the sensing field; and returning the radio-frequency proximity reader to the wait state or sleep mode. The step of detecting may include sensing a change in a physical characteristic within the sensing field such as a change in position of an object not necessarily an ID tag within the sensing field of the RFID reader The change in position may be made by infrared, inductive, capacitive, ultrasound or microwave sensing.

BRIEF DESCRIPTION OF THE DRAWINGS

FIG. 1 is a block diagram of a low power consumption radio frequency identification system according to this invention;

FIG. 2 depicts a low-power RFID reader system according to this invention featuring a passive infrared secondary detector; and FIG. 3 is a plan view diagram of the low-power RFID reader system of FIG. 2 illustrating the RFID sensing field and overlapping passive infrared field of view.

DETAILED DESCRIPTION OF THE PREFERRED EMBODIMENTS

With reference to the accompanying drawing, FIG. 1 shows in block diagram form a low-power identification tag reader system generally designated by numeral. Reader system 10 includes a radio frequency tag reader 12 which may be any type of radio frequency reader, but for reasons given herein, this invention is particularly useful with proximity or passive RFID tag readers because of their greater operating power consumption. The reader system 10 is supplied with operating power by electrical power supply 14 connected to the reader 12 through a power control circuit or switch 16. Power supply 14 may be an A.C. line power supply but will normally be a battery power supply since a principal object of this invention is to enable practical battery operation of the reader system 10.

The tag reader 12 has a radio frequency antenna 18, suggested in phantom lining in FIG. 2, which emits an interrogation signal designed to evoke a response from ID tags in sufficient proximity to the reader 12, and to receive a radio frequency response signal from any such ID tags. The antenna or antenna system of the tag reader 12 has a sensing field S, suggested b the concentric arcs in FIG. 3, within which the ID reader is capable of evoking a response from ID tags and also to receive the response signal from the tags. Outside of this sensing field, the strength of the interrogation signal may be insufficient to evoke a response, or if a response is evoked, the strength of the response signal at the antenna 18 is too weak to be read by the reader 12. Not only is the range of the tag reader 12 limited in terms of distance from the antenna, but the range may also vary with direction from the antenna, i.e., the antenna may be a directional pattern with greatest sensitivity in a particular direction and diminishing sensitivity away from that direction. Directionality of the tag reader may be further determined not only by the antenna radiation pattern but also by the physical environment around the reader. If the reader system 10 is mounted on a wall W as in FIG. 3, then the effective sensing field S is limited to the area in front of that wall because ID tags will be present only in that area and not behind the wall, even though the tag reader's radio frequency field may in fact extend through and behind the wall. Consequently, the sensing field of the tag reader 12 is limited in range and direction by its radio frequency signal radiation and reception patterns and by the physical environment around the reader system 10 as in FIGS. 2 and 3.

According to this invention a secondary detector 20 is provided having a field of view V which generally overlaps the sensing field S of the RFID tag reader 12. The presently preferred secondary detector 20 is a passive infrared (PIR) motion detector of the type commonly used in home security systems for turning on lights in response to changes in the infrared background in the detector's field of view, such as a person's moving body in front of the PIR detector. PIR detectors of this type are now commercially available at low cost. In conventional applications the PIR detector derives an output signal which is typically used to trigger a security alarm or to switch lights.

When implemented according to this invention as the secondary detector 20, a PIR detector is arranged and positioned as in FIGS. 2 and 3 relative to the RFID reader 12 so as to detect, for example, the presence of a hand waving an ID tag in front of the RFID tag reader 12. The output signal of the secondary detector is connected as an ON control signal to power control switching circuit 16.

In an initial wait state of the tag reader 12 the power control switch 16 is turned off to inactivate the RFID reader 12. When a moving object such as an ID tag holder's hand is detected by the PIR secondary detector 20, the resulting ON control signal of the secondary detector actuates power switch 16 for supplying electrical power to RFID reader 12 from power supply 14, thereby activating the RFID reader. In its now active state the tag reader 12 operates in a conventional manner and transmits a radio frequency signal designed to evoke a radio-frequency response from any ID tags within range of the reader, and listens for any radio frequency response from the ID tags. Typically, the tag reader 12 will remain turned on only for the length of time necessary to read an ID tag. If after an appropriate time no ID tag response is evoked by the reader's transmission, the reader outputs an OFF control signal to the power control switch, thereby shutting down power and returning the reader to a wait state. If the secondary detector in fact detected the entry of an ID tag into the sensing field s, the tag reader 12 then also executes an access control function to enable access to the protected facility, such as by opening an electric door lock and returning the facility to a locked condition. Upon completion of the access control cycle, the reader outputs the OFF control signal to the power control switch and is returned to a wait state. The tag reader 12 typically operates under control of a microprocessor, and the output of the OFF control signal at the appropriate time is accomplished by suitable programming of the microprocessor.

The power control switch 16 may operate to suspend only some functions of the RFID reader rather than completely turning off power to the tag reader. It may be undesirable to entirely shut-down the tag reader 12 because certain initialization functions of the microprocessor would require re-execution upon every power-up. For this reason, the ON control signal may instead operate to invoke certain functions and subroutines of the microprocessor needed to actively sense and read ID tags, while keeping the microprocessor in a low power state in the wait state of the tag reader. That is, the wait state of the tag reader 12 is any state where power consumption of the tag reader is limited to less than its normal operating requirements for detecting and reading ID tags.

The on-time of the RFID reader per ID tag may be quite short, of the order of a few seconds, depending on the type of access being controlled. By limiting the on-time of the RFID reader in this fashion, the RFID reader duty cycle, i.e. on-time of the RFID reader 12 relative to operating time of the reader system 10, can be made very small, thereby greatly reducing the power consumption of the combined RFID/PIR system 10 and making practical battery operation of such combined readers. The combined reader 10 may be packaged for either portable or stationary use, in any housing that may suit practical and esthetic considerations.

Passive IR detectors consume little power as compared to passive RFID detectors because the PIR detector does not emit a signal but rather responds to the presence of radiation emitted by a warm object or body. However, the choice of secondary detector is not limited to infrared detectors. Other motion sensing technologies are available which may be adapted for the purposes of this invention. For example, inductive or capacitive type sensors may be implemented as the secondary detector 20 for detecting the entry of an object into the sensing field of the RFID reader by detecting changes in inductance or capacitance in the environment near the reader. Similarly, ultrasound and microwave motion sensors are available and can be substituted for the passive infrared detector 20. Generally, a passive sensing technology such as inductive or capacitive will normally be preferred to an active technology such as microwave or ultrasound motion sensing because passive detectors typically consume less electrical power. For greater sensitivity and reliability, multiple secondary detectors 20 may be installed and connected in OR logic so that the RFID reader is turned on if either of multiple secondary detectors is activated. Multiple secondary detectors may also be connected in AND fashion so that the RFID readers turns on only if both secondary detectors are activated to reduce false activations of the reader.

While a presently preferred embodiment of the invention has been described and illustrated for purposes of example and clarity it must be understood that many changes, substitutions and modifications to the described embodiment will be apparent to those having only ordinary skill in the art without thereby departing from the scope of the present invention as defined by the following claims.

What is claimed is:

1. A low-power radio-frequency proximity reader system comprising:
   a tag reader operative for detecting the presence of an identification tag by evoking a radio-frequency response from identification tags present within a sensing field of said reader;
   secondary detector operative for detecting entry of an object including but not limited to identification tags into said sensing field by means other than evoking a radio-frequency response from said object and deriving an enabling control signal responsive to said detecting;
   power supply means for supplying operating power to said tag reader and to said secondary detector, said detector and said tag reader each having and average operating power requirement, said detector selected to have a substantially smaller average operating power requirement than said tag reader; and
   a power control switch normally limiting power from said power supply means to said tag reader and operative for enabling power to said tag reader for a limited period of time in response to said enabling control signal;
   such that operating power of the proximity reader system is conserved by operating the tag reader only upon entry of an object into the tag reader's sensing field.

2. The reader of claim 1 wherein said tag reader has a transmitter circuit and a receiver circuit connected to an antenna for transmitting a radio-frequency interrogation signal and decoding a response returned by identification tags within said sensing field of the tag reader.

3. The reader of claim 1 wherein said secondary detector is a motion detector.

4. The reader of claim 3 wherein said motion detector is a passive infrared detector.

5. The reader of claim 1 wherein said secondary detector is selected from the group comprised of infrared, inductive, electrostatic, microwave and ultrasound detectors.

6. The reader of claim 1 wherein said limited period of time is approximately the time period required to transmit a radio-frequency interrogation signal and receive and decode a response from an identification tag present in said sensing field, and executing an access control function by said tag reader, so that the operating time of the tag reader is substantially minimized.

7. The reader of claim 1 wherein said tag reader provides an off control signal to said switch for returning said tag reader to a power limited state.

8. A method of operating a radio-frequency proximity reader having a sensing field, comprising the steps of:
   placing said radio-frequency proximity reader in a wait state;
   detecting the introduction of an object into said sensing field; and
   activating said radio-frequency reader for a period of time generally sufficient for evoking a response from an identification tag is present in said sensing field; and
   returning said radio-frequency proximity reader to said wait state.

9. The method of claim 8 wherein said step of detecting comprises sensing a change in a characteristic of said sensing field selected from the group comprised of infrared background, microwave reflectivity, ultrasound reflectivity, inductance and capacitance.

10. A low-power radio-frequency proximity reader system comprising:
   a proximity RFID tag reader operative for detecting the presence of an identification tag by evoking a radio-frequency response from identification stages present within a sensing field of said reader;
   a passive infrared secondary detector oriented, arranged and positioned for viewing said sensing field thereby to detect entry of an object including but not limited to identification tags into said sensing field and deriving an on control signal responsive to said detecting;
   power supply means for supplying operating power to said tag reader and to said secondary detector, said detector and said tag reader each having an average operating power requirement, said secondary detector selected to have a substantially smaller operating power requirement than said tag reader; and
   a power control switch normally limiting power from said power supply means to said tag reader and operative for enabling power to said tag reader upon detecting entry of said object into the said sensing field thereby to test for the presence of an identification tag in said sensing field;
   said tag reader providing an off control signal to said switch for returning said tag reader to a power limited state upon completion of an access control function;
   such that operating power of the proximity reader system is conserved by operating the tag reader at a low duty cycle relative to said secondary detector.

* * * * *